United States Patent [19]

Prater

[11] Patent Number: 4,797,081

[45] Date of Patent: Jan. 10, 1989

[54] MANDREL FOR MAKING ELASTOMERIC ARTICLES

[76] Inventor: Ronald E. Prater, 3432 N. Washington Rd., Fort Wayne, Ind. 46804

[21] Appl. No.: 24,067

[22] Filed: Mar. 10, 1987

[51] Int. Cl.$^4$ .......................................... B29C 67/24
[52] U.S. Cl. .................................. 425/275; 249/177; 249/183; 425/DIG. 44
[58] Field of Search ............................ 249/177, 183; 425/DIG. 44, 269, 270, 272, 275

[56] References Cited

U.S. PATENT DOCUMENTS

| | | | |
|---|---|---|---|
| 1,841,886 | 1/1932 | Gammeter | 264/154 |
| 1,948,608 | 2/1934 | Abbott, Jr. | 425/55 |
| 1,997,784 | 4/1935 | Beal | 264/304 |
| 2,053,372 | 9/1936 | Lee | 425/269 |
| 2,298,101 | 10/1942 | Beal | 264/154 |
| 2,801,897 | 8/1957 | Fry | 425/275 |
| 3,436,366 | 4/1969 | Modic | 524/862 |
| 3,847,848 | 11/1974 | Beers | 523/213 |

FOREIGN PATENT DOCUMENTS 3444108 6/1986 Fed. Rep. of Germany ...... 249/183

Primary Examiner—Willard Hoag
Attorney, Agent, or Firm—Barnes & Thornburg

[57] ABSTRACT

A one-piece mandrel for making elastomeric articles by a dipping process has a one-piece body which includes at least one opening extending therethrough. A split extends from the opening through a cross-section of the one-piece body. At least a portion of the body adjacent the split is formed of an elastically resilient material to allow the split to open for removal of the elastomeric article after formation, and to cause the split to self-close after removal of the article from the mandrel. Closure of the split forms a substantially continuous molding surface in the immediately vicinity of the split. Proper alignment of the mating surfaces of the split is assured by irregular (non-planar) design of the split surfaces, or by use of an alignment element embedded in the mandrel. In embodiments where a ferro-magnetic alignment element is used, a separate magnetized element may also be embedded in the mandrel to assist in holding the split closed during the dipping process. If necessary or desired, both elements may be magnetized.

21 Claims, 1 Drawing Sheet

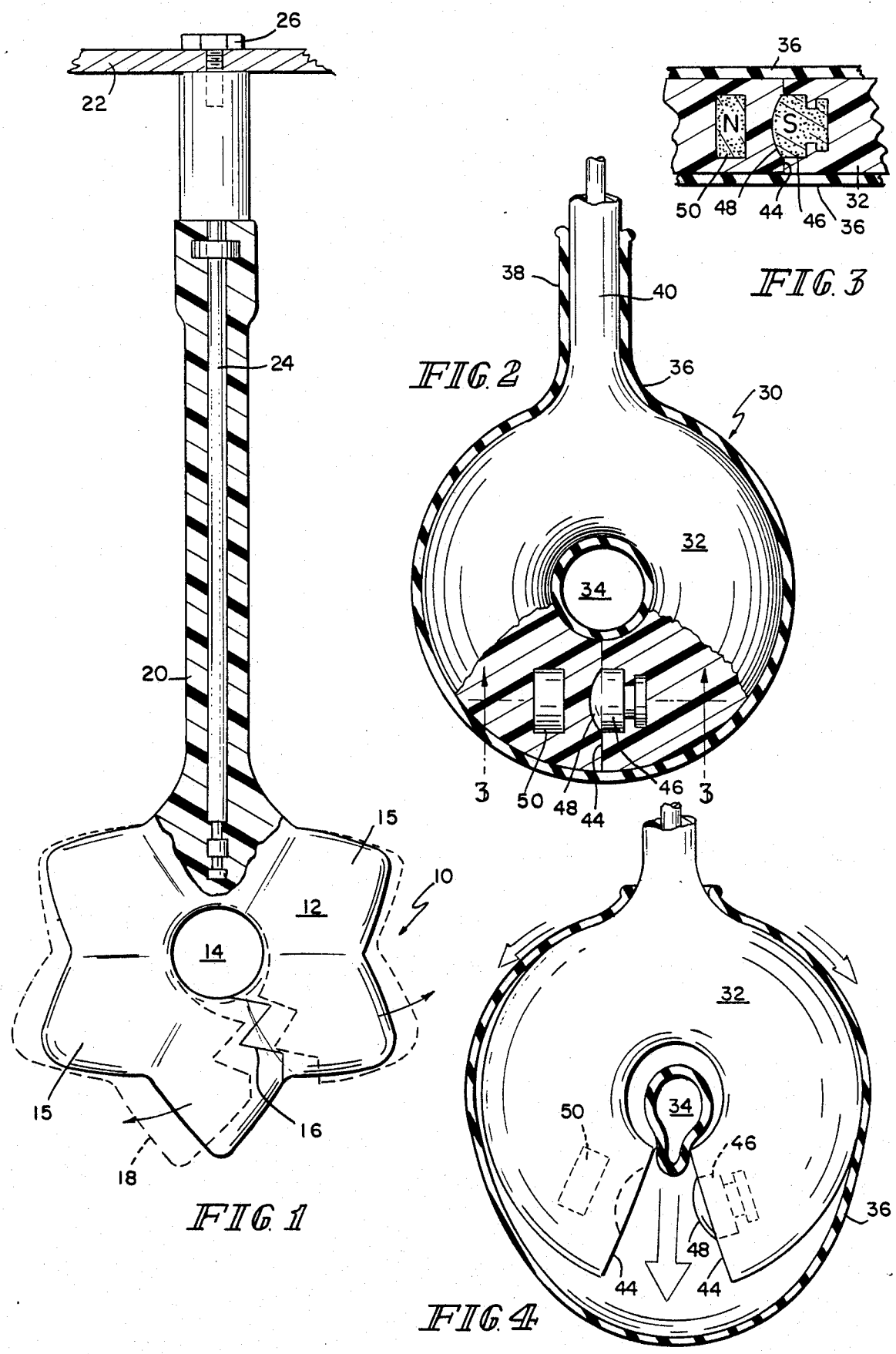

MANDREL FOR MAKING ELASTOMERIC ARTICLES

BACKGROUND AND SUMMARY OF THE INVENTION

This invention relates in general to a mandrel or form for making an elastomeric article by a dipping process and, in particular, to a one-piece mandrel formed of an elastically resilient material for making a thin-walled elastomeric article (such as a balloon). A particularly advantageous embodiment of the mandrel of the present invention, as described in detail below, is especially well-suited for making a balloon or like article having at least one opening or hole in the body thereof (i.e., a balloon or article having the shape of a torus or its topological equivalent).

A number of articles such as surgeons' gloves, translucent drug sundries, footwear, flexible squeeze toys, and metal-coated compounds are made by dipping processes. These processes include simple dipiing, where one or more coats are applied with no coagulate being used; the Anode process, where a form is first dipped into coagulate and then into an elastomeric compound (such as natural rubber latex); and the Teague process, where the form is first dipped into an elastomeric compound and then into the coagulate. Of these processes, the Anode process enjoys the most popularity.

In the case of latex articles formed by the Anode process, the form or mandrel, which is usually aluminum, porcelain or stainless steel, is first dipped into the coagulate and then into the latex compound which is contained in a dipping tank provided with mechanical agitation and a temperature controlled jacket. The form may be dipped manually or by automatic operation. After withdrawal, the form is usually rotated to ensure even distribution of the deposited latex. Leaching, drying and preliminary finishing operations such as beading or trimming then follow. The latex articles may be vulcanized in circulating hot air, steam or hot water. Vulcanization may take place on or off the form. The cured articles are then stripped from the form in a wet or dry condition. Finishing operations typically include washing and drying.

Due primarily to the nature of the stripping operation, it is inherently difficult to make relatively small, thin-walled latex articles, such as balloons, by a dipping process when such articles are provided with one or more openings in the bodies thereof. U.S. Pat. No. 2,053,372 to Lee relates to a technique for making irregularly shaped inflatable articles using forms which are collapsible so as to allow for their removal from the formed articles subsequent to the dipping process. FIG. 5 of Lee's patent shows a form 39 in the shape of a flying horse having a central opening 41 formed therein. Form 39 is made of a relatively rigid material, such as a filled manila paper, and is destroyed in the stripping process. According to Lee, it is not possible to make such a form of a flexible, collapsible material (such as rubber) since the form must be broken to remove the form from the article.

U.S. Pat. Nos. 1,841,886 and 1,948,608 show annular forms used in making relatively large endless tubes of rubber (i.e., inner tubes). Each of these forms is provided with a split to allow for removal of the formed tube, and a connecting element, such as a bolt or a locking mechanism, to draw the facing surfaces of the split together. While such an arrangement is appropriate for use in forming the relatively large, thick-walled articles described in these patents, a similar arrangement would be impractical to implement in manufacturing large numbers of relatively small, thin-walled articles (such as balloons) because, during the stripping process, too much time would be required to disconnect and reconnect the locking mechanism. Such an arrangement would also be impractical to implement in manufacturing relatively thin-walled articles because it would be difficult to obtain a substantially continuous surface in the vicinity of the split which is important in the manufacture of such articles without objectionable seams and flash.

An object of the present invention is to provide an improved form or mandrel for making elastomeric articles by a dipping process.

Another object of the present invention is to provide a mandrel which can be efficiently used in a high volume production setting to produce articles, such as balloons, which are provided with at least one opening in the bodies thereof.

Yet another object of the present invention is to provide a mandrel for forming articles having at least one opening in the bodies thereof in which the articles can be easily removed from the mandrel.

Still another object of the present invention is to provide a mandrel which has a substantially continuous surface permitting the manufacture of thin elastomeric articles without objectionable seams and flash.

A further object of the present invention is to provide a one-piece mandrel having a self-closing and self-aligning split through a cross-sectional portion thereof.

These and other objects of the invention are attained in a one-piece mandrel for making an elastomeric article by a dipping process, which has a one-piece body having at least one opening therein and a split extending from the opening through a cross-section of the body. The body is formed of an elastically resilient material so as to allow the split to be opened for removal of the elastomeric article after formation, and so as to cause the split to re-close after removal of the article from the mandrel to form a substantially continuous surface on the mandrel in the vicinity of the split. In a preferred embodiment of the invention, a portion of the one-piece mandrel body extends through a wall of the article. In an especially preferred embodiment, this portion provides a molding surface for forming a hollow stem on the article. The portion of the one-piece body which extends through the wall of the article is also preferably adapted for attaching the mandrel to a dipping apparatus.

In the preferred embodiment, the mandrel is provided with means for causing the mating facing surfaces of the split to self-align upon closure thereof. In one embodiment, the means for aligning the surfaces include the use of an "irregular" split in which at least one protrusion is formed on a first of the surfaces, and a mating depression is formed in the other surface. Alternatively, an alignment element, which is at least partially embedded in the one-piece body, may be used. A portion of the alignment element extends from a first of the mating surfaces, and a mating depression to accept the extending portion of the alignment element is formed in the other surface. In an especially preferred embodiment, the alignment element is formed of a ferro-magnetic material (such as steel), and a magnetized element is embedded in the mandrel adjacent the depression in the second of the mating surfaces to assist in holding the mating surfaces together during the dipping process.

In a preferred embodiment of the invention, the one-piece mandrel is formed of a silicon rubber compound having a Shore A hardness ranging from 20–90 (and preferably from 60–75), a tensile strength of 500–1,100 pounds per square inch, a percentage elongation of 150–360 percent, a tear strength of 55–120 pounds per square inch, and a continuous service temperature rating of at least 212° F. Such material is resistant to water, mild acids and bases.

Other objects, advantages and novel features of the present invention will become apparent from the following detailed description of the invention when considered in conjunction with the accompanying drawings.

BRIEF DESCRIPTION OF THE DRAWINGS

FIG. 1 shows a schematic view of a mandrel construction in accordance with the present invention.

FIG. 2 shows a schematic view of an alternative embodiment of the mandrel of the present invention.

FIG. 3 shows a partial sectional view taken along line 3—3 of FIG. 2.

FIG. 4 illustrates the removal of a formed article from the mandrel shown in FIG. 2.

DETAILED DESCRIPTION OF THE DRAWINGS

FIG. 1 shows a schematic view of an embodiment of a one-piece mandrel 10 constructed in accordance with the present invention. Mandrel 10 includes a body portion 12 which is provided with an opening 14 which, in this embodiment, extends through the approximate center of body portion 12. The shape of body portion 12 in this embodiment is somewhat irregular in that a number of lobes 15 are formed around the outer periphery of body portion 12. This shape is, of course, imparted to the articles formed on mandrel 10, and a wide variety of different shapes and lobe configurations may be used. Mandrel 10 is preferably formed of an elastically resilient material which is described in additional detail below.

Extending from opening 14 through a cross-section of body portion 12 is a split 16 which, in the preferred embodiment shown in FIG. 1, is irregular (i.e., non-planar) in design. This irregular design produces mating protrusions and depressions, respectively, on facing surfaces of the split. These protrusions and depressions assure precise re-alignment of the mating surfaces when the split is opened and subsequently allowed to close. Thus, the surface of mandrel 10 in the immediate vicinity of split 16 will be substantially continuous and smooth.

Mandrel 10 is preferably formed of an elastically resilient material which will allow split 16 to be opened for removal of the elastomeric article formed on the mandrel, and which will cause the split to close after removal of the article from the mandrel. A portion of mandrel 10 in FIG. 1 is shown, in dashed lines, after being elastically deformed so as to open split 16. This portion of mandrel 10 is generally designated by reference numeral 18. The resilience of the material forming the mandrel is such that, when portion 18 is subsequently released, split 16 will be closed by the resilience and elasticity of the material forming the mandrel. This is an important and advantageous feature of the mandrel of the present invention since the stripping operation is normally conducted on a large number of such mandrels at a given stage of the production process, and separate operations to unlock or otherwise disengage the splits on the individual mandrels prior to stripping, and to close the splits on individual mandrels after stripping, would greatly increase the cost and complexity of the manufacturing process.

On a side of mandrel 10 which is almost directly opposite from split 16 is an elongate portion 20 of mandrel 10 which extends outwardly from body portion 12 to form a means by which mandrel 10 may be attached to a dipping apparatus 22 (not shown in detail). In the preferred embodiment illustrated, a metallic element 24 is embedded inside portion 20 and is attached to dipping apparatus 22 by means of bolt 26. The surface of elongate portion 20 immediately adjacent body portion 12 preferably provides a molding surface to form a hollow stem on the article to be formed on mandrel 10.

FIG. 2 shows an alternative embodiment of the present invention which comprises a one-piece mandrel 30 having a body portion 32 provided with an opening 34 extending through the approximate center of body portion 32. Mandrel 30 has been used to form, by a dipping process, article 36 which is a doughnut-shaped balloon provided with a stem 38 through which the balloon is inflated. Stem 38 is formed around the surface of portion 40 of mandrel 30, which portion intersects the outer periphery of body portion 32 and extends upwardly in FIG. 2 to be attached to a dipping apparatus which is not illustrated.

Body portion 32 is provided with a split 44 which extends from opening 34 through a cross-section of body portion 32. Unlike split 16 in FIG. 1, split 44 is generally planar in design, except that, in the preferred embodiment shown in FIG. 2, an alignment element 46 is embedded in mandrel 30 in the immediate vicinity of the split. At least a portion of alignment element 46 extends through the plane of split 44 into a mating depression 48 formed in the adjacent mating surface of split 44. As with the mandrel discussed in connection with FIG. 1, mandrel 30 is formed of an elastically resilient material which allows split 44 to be opened for removal of article 36 subsequent to the dipping process, and which causes split 44 to close after the removal or stripping operation is complete. The removal of article 36 from mandrel 32 is illustrated in FIG. 4 of the drawings. Alignment element 46 and mating depression 48 assure that the closing of split 44 results in a substantially continuous and smooth molding surface in the vicinity of the split.

Alignment element 46 is preferably made of a ferromagnetic material such as steel. In an especially preferred embodiment of the invention, a magnetized element 50 is embedded in mandrel 30 immediately adjacent to depression 48, and the portion of alignment element 46 which extends into depression 48, to assist in holding split 44 firmly together during the dipping process. If needed or desired, both elements 46 and 50 may be formed of magnetized materials, as illustrated in FIG. 3.

The material used to form mandrels such as those described above must be elastically resilient in order for the mandrels to function as intended, and must also be capable of withstanding the conditions of the manufacturing environment for prolonged periods. The inventor has found that a silicon rubber compound having the following characteristics (when cured) is especially advantageous in the practice of the present invention:

Shore A Hardness: 20–90 (preferably 60–75)
Tensile Strength (lbs./in$^2$): 500–1,100
Elongation (%): 150–360
Tear strength (lbs./in2): 55–120
Continuous Service Temperature: greater than 212° F.

A specific material which has such characteristics is RTV 664 silicon rubber molding compound manufactured by the General Electric Company. Other materials can be used as well. It is also possible that two or more materials could be used to form a mandrel having the functional characteristics of those described above. Such a mandrel would be considered to fall within the scope of the present invention, as defined by the claims which follow below.

From the preceding description of the preferred embodiments, it is evident that the objects of the invention are attained. Although the invention has been described and illustrated in detail, it is to be clearly understood that this description is to be taken by way of illustration and example only and is not to be taken by way of limitation. The spirit and scope of the invention are to be limited only by the terms of the appended claims.

What is claimed is:

1. A one-piece mandrel, suitable for making a thin-walled elastomeric article by a dipping process, said mandrel comprising a one-piece body having at least one opening therein and a split extending from the opening through a cross-section of the one-piece body, at least a portion of said body being formed of an elastically resilient material such as to allow the split to open for removal of the elastomeric article after formation thereof, and substituted to cause the split to automatically close after removal of the elastomeric article from the mandrel to form a substantally continuous surface of the mandrel in the vicinity of the split, and wherein a portion of said one-piece body extends generally radially outwardly from said body, said portion having means for mounting the mandrel to a dipping apparatus.

2. A one-piece mandrel according to claim 1, wherein said split has mating facing surfaces, and further comprising means for self-aligning the surfaces of the split upon closure thereof.

3. A one-piece mandrel according to claim 2, wherein said means for aligning the surfaces of the split include at least one protrusion on a first of said surfaces, and a mating depression on a second of said surfaces.

4. A one-piece mandrel according to claim 2, wherein said means for self-aligning the surfaces of the split comprise an alignment element, at least partially embedded in said one-piece body, a portion of said alignment element extending from a first of said mating surfaces, and a mating depression in a second of said surfaces to accept the portion of the alignment element extending from said first surface.

5. A one-piece mandrel according to claim 4, wherein said alignment element is formed of a magnetically responsive material, and wherein a magnetic element is embedded in the mandrel adjacent the depression in the second of said mating surfaces to assist in holding the mating surfaces together during the dipping process.

6. A one-piece mandrel according to claim 1, wherein said split has mating facing surfaces, and further comprising means for holding the mating surfaces together during the dipping process.

7. A one-piece mandrel according to claim 6, wherein said means for holding the mating surfaces together include magnetic means at least partially embedded in said one-piece body adjacent the mating facing surfaces of the split.

8. A one-piece mandrel according to claim 1, wherein said portion which extends radially from said body provides a molding surface for forming a hollow stem on the article.

9. A one-piece mandrel according to claim 1, wherein said elastically resilient material is a silicon rubber compound having a Shore A hardness ranging from 20–90.

10. A one-piece mandrel according to claim 9, wherein said Shore A hardness ranges from 60–75.

11. A one-piece mandrel according to claim 9, wherein said silicon rubber compound has a tensile strength of 500–1,100 pounds per square inch.

12. A one-piece mandrel according to claim 11, wherein said silicon rubber compound has a percentage elongation of 150–360, a tear strength of 55–120 pounds per square inch, and a continuous service temperature rating of at least 212° F.

13. A one-piece mandrel, for making balloons and like articles by a dipping process, formed from an elastomeric composition having a Shore A hardness ranging from 20–90, a tensile strength ranging from 500–1,100 pounds per square inch, a percentage elongation of 150–360 percent, a tear strength of 55–120 pounds per square inch, and a continuous service temperature equal to or greater than 212° F., wherein said mandrel comprises a one-piece body having at least one opening therein and a split extending from the opening through a cross-section of the one-piece body, said body being elastically resilient and such as to allow the split to open for removal of the elastomeric article after formation thereof, and sufficient to cause the split to close after removal of the elastomeric article from the mandrel, and wherein a portion of said one-piece body extends generally radially outwardly from the body, said portion having means for mounting the mandrel to a dipping apparatus.

14. A one-piece mandrel according to claim 13, wherein said Shore A hardness ranges from 60–75.

15. A one-piece mandrel, suitable for making a thin-walled elastomeric article by a dipping process, comprising:
   a one-piece body having at least one through opening therein, and a split extending from the opening through a cross-section of the one-piece body, at least a portion of said body being elastically movable so as to allow the split to open for removal of the elastomeric article after formation thereof;
   means for automatically closing and aligning the split after removal of the elastomeric article from the mandrel to form a substantially continuous surface of the mandrel in the vicinity of the split; and
   means extending generally radially outwardly from the body for mounting the mandrel to a dipping apparatus.

16. A one-piece mandrel according to claim 15, wherein said means for aligning the split includes at least one protrusion on a first surface of the split, and a mating depression on a second adjacent surface of the split.

17. A one-piece mandrel according to claim 15, wherein said means for aligning the split comprises an alignment element, at least partially embedded in the one-piece body, a portion of said alignment element extending from a first surface of the split, and mating depression in a second surface of the split to accept the portion of the alignment element extending from said first surface.

18. A one-piece mandrel according to claim 17, wherein said alignment element is formed of a ferrous material, and wherein a magnetic element is embedded in the mandrel adjacent the depression in the second surface of the split to assist in holding the split together during the dipping process.

19. A one-piece mandrel according to claim 15, wherein said split has mating facing surfaces, and further comprising means for holding the mating surfaces together during the dipping process.

20. A one-piece mandrel according to claim 19, wherein said means for holding the mating surfaces together include a magnet.

21. A one-piece mandrel according to claim 15, wherein said one-piece mandrel is formed of a silicon rubber molding compound.

* * * * *